July 6, 1965        S. CHAIT        3,193,750
DUAL RATE BATTERY CHARGER WITH D.C. REFERENCE SOURCE
Filed Jan. 18, 1962
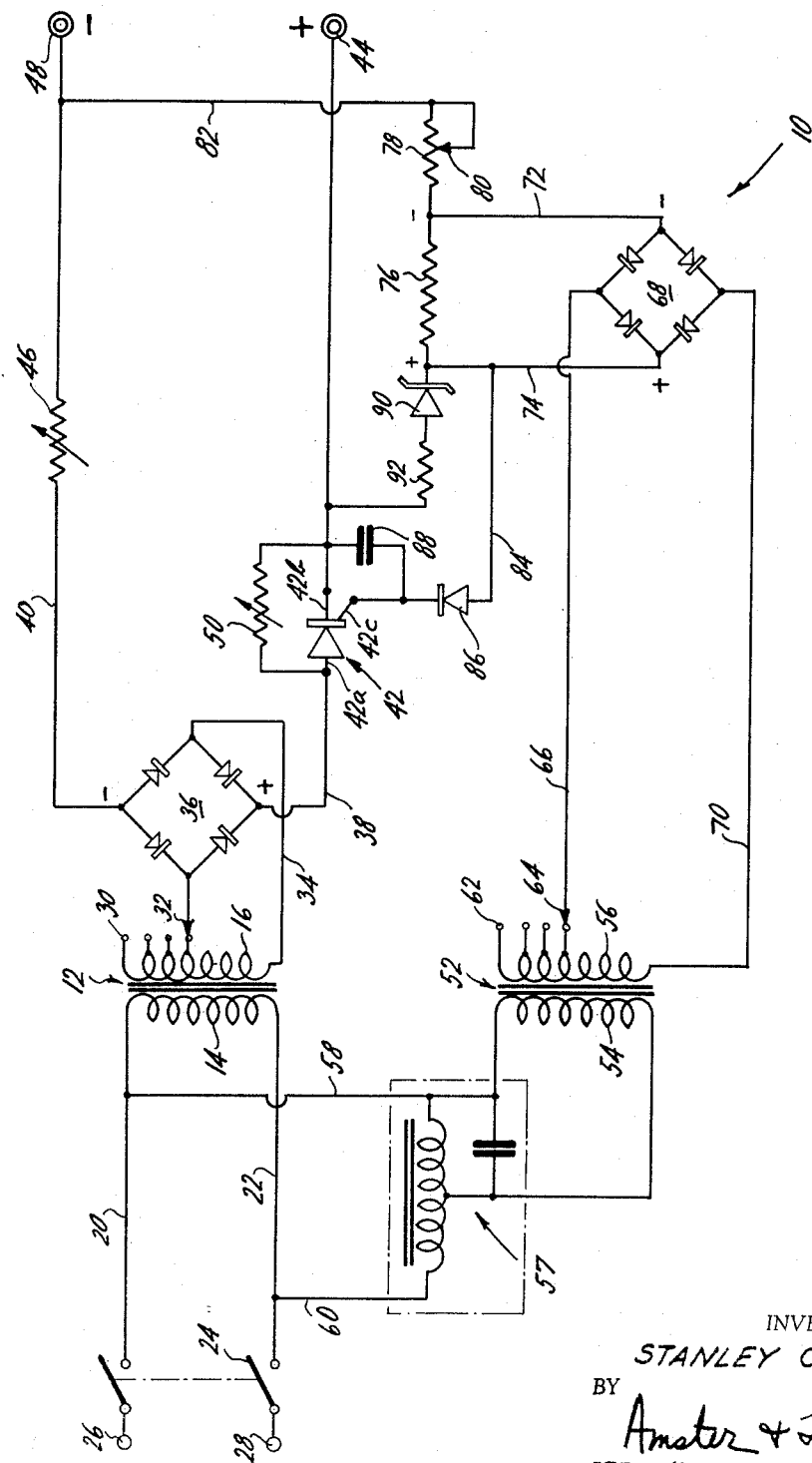
INVENTOR.
*STANLEY CHAIT*
BY
ATTORNEYS

3,193,750
DUAL RATE BATTERY CHARGER WITH
D.C. REFERENCE SOURCE
Stanley Chait, Bronx, N.Y., assignor to Macarr, Inc.,
Bronx, N.Y., a corporation of New York
Filed Jan. 18, 1962, Ser. No. 167,103
6 Claims. (Cl. 320—22)

The present invention relates generally to a device for charging direct current batteries, and in particular to a battery charger which automatically charges the battery at varying rates which are a function of the voltage at the terminals of such battery.

Conventional battery charger or regulators, and particularly those used for charging relatively large capacity batteries, usually employ electromechanical voltage relays which inherently present a number of problems, including sticking, contact burning, a wide range of pick-up and drop-out, the need for constant adjustment due to wear, sensitivity to changes in ambient temperature, and the like. Of recent times, there has been developed a silicon controlled rectifier which may serve as a high current, high voltage, high efficiency switch. It has been suggested that such silicon controlled rectifiers would be suitable for providing a battery charger which is free of the difficulties encountered when using electromechanical voltage relays. There exists a need for battery chargers which embody such silicon controlled rectifiers and their inherent advantages, yet also exhibit the necessary properties for commercial acceptance, including, without limitation, the facility for charging the battery at several rates, the automatic switch over of the charging rate as a function of the battery voltage, relative simplicity in the circuitry and other features which will become apparent as the description proceeds.

Broadly, it is an object of the present invention to provide an improved battery charger or regulator which exhibits one or more of the aforesaid advantages. Specifically, it is within the contemplation of the present invention to provide a battery charger incorporating a high current, high voltage switch, such as a silicon controlled rectifier, which is capable of charging the battery at a relatively high rate until such time as the battery potential reaches a preset value, and thereafter continues to charge the battery at a relatively low or trickle rate which will maintain the battery voltage at a stable level or allow the battery voltage to gradually lower due to loading or electrochemical action at which lowered voltage level, the charger will once again automatically switch to the high-rate charging of the battery.

In accordance with an illustrative embodiment demonstrating objects and features of the present invention, there is provided a battery charger which comprises a charging source of direct current potential, a reference source of direct current potential, and positive and negative charging terminals adapted to have the corresponding terminals of a battery connected thereto. Connected between the charging source and the positive and negative charging terminals is a controlled rectifier including a cathode, anode and gate, with the controlled rectifier being arranged to block in the forward direction until a gating signal is applied between the gate and cathode and to thereafter conduct in the forward direction. The anode of the control rectifier is connected to the positive side of the charging source and the negative side of the charging source in connected to the negative charging terminal, preferably through an adjustable resistance which will establish the high charging rate for the battery charger. The cathode of the controlled rectifier is connected to the positive charging terminal. The gate is connected to the positive side of the reference source. A gating-signal circuit is provided which includes the reference source and a series-connected resistance, with the latter being connected between the negative side of the reference source and the negative charging terminal which produces a gating signal for the controlled rectifier as a function of the voltage difference between the reference source and the potential of the battery connected across the charging terminals. In response to gating, the rectifier conducts in the forward direction and establishes a high-rate charging circuit for the battery. During the intervals when the rectifier is blocking in the forward direction and effectively provides an open circuit in the high-rate charging circuit, a resistance bypasses the controlled rectifier and establishes a trickle charging circuit for the battery.

The above brief description, as well as further objects and features of the present invention will be more fully appreciated by reference to the following detailed description of a presently preferred, but nonetheless illustrative embodiment according to the present invention, when taken in conjunction with the accompanying drawings, wherein the single figure is a schematic diagram of an improved battery charger embodying features of the present invention.

Referring now specifically to the drawings, there is shown a battery charger embodying features of the present invention and generally designated by the reference numeral 10. The battery charger or regulator 10 includes a power input transformer 12 having a primary 14 and a secondary 16. The primary 14 of the power input transformer 12 is connected via the input lines 20, 22 through a double-pole, single-throw switch 24 to input terminals 26, 28 which may be connected to an appropriate source of alternating current potential. The secondary 16 of the power input transformer 12 is provided with plural taps 30 which may be contacted stepwise by a movable contactor 32. Connected between the contactor 32 and the secondary lead 34 is a full-wave bridge rectifier 36 including four silicon diodes or the like which are appropriately poled in relation to each other to provide full-wave rectified direct current voltage at the positive and negative leads 38, 40. The positive lead 38 is connected through a silicon controlled rectifier 42 to a positive charging terminal 44, while the negative direct current lead 40 is connected through an adjustable resistance 46 to a negative charging terminal 48. As is generally understood, the corresponding terminals of a battery are connected across the positive and negative charging terminals 44, 48. The silicon controlled rectifier 42, which may be of the type manufactured by General Electric Company and described in their publication entitled Controlled Rectifier Manual, First edition, published in 1960, includes an anode 42a, a cathode 42b, and a gate 42c. The controlled rectifier blocks in the forward direction until a gating signal is applied to the gate 42c and thereafter conducts in the forward direction to provide a low impedance path between the anode 42a and the cathode 42b. It will be appreciated that when the silicon controlled rectifier 42 conducts in a forward direction, much like a conventional diode, that a charging circuit will be completed between the positive and negative output leads 38, 40 of the full-wave rectifier 36 which will charge at a rate determined by the setting of tap 32 on the secondary 16 of the power input transformer 12, the forward conducting resistance of the diodes in the full-wave rectifier 36, the forward conducting resistance of the silicon controlled rectifier 42, and the setting of the adjustable resistance 46.

In order to establish a low rate or trickle charging circuit which will either maintain the voltage of the battery connected across the charging terminals 44, 48 at a stable voltage level determined by the trickle charge, or permit the same to gradually lower due to loading or electrochemical action, an adjustable resistance 50 is connected across the silicon controlled rectifier 42 between the anode 42a and the cathode 42b. In the event that the provision of the trickle charging circuit is not required or is undesirable, it is possible to remove the resistance 50 to establish an open circuit in the positive lead 38 and the battery charger 10 would then be of the "on-off" type.

In order to obtain a gating potential to render the controlled rectifier 42 conductive in the forward direction and to complete the high-rate circuit, provision is made for establishing a reference voltage source which is compared with the battery voltage appearing across the positive and negative charging terminals 44, 48. Specifically, the source of reference voltage includes a reference voltage transformer 52 including a primary 54 and a secondary 56. The primary 54 of the reference voltage transformer 52 is connected to the A.C. line via a voltage stabilizer 57, such as a magnetic-resonant line voltage stabilizer of the type which is available under the trademark Sola and is of conventional construction. The input to the line voltage stabilizer 57 is derived via auxiliary input lines 58, 60 connected respectively to the input lines 20, 22. The secondary 56 of the reference voltage transformer 52 includes plural taps 62 which are engaged stepwise by an adjustable contactor 64. The adjustable contactor 64 is connected via power input lead 66 to one side of a full-wave direct current rectifier 68, with the other side thereof being connected via power input lead 70 to the other side of the secondary 56 of the transformer 52. The full-wave rectifier 68, which includes four semiconductor diodes, such as of silicon, provides full-wave rectified direct current on the output leads 72, 74 which is connected across a resistor 76 which pre-loads the full-wave rectifier 68 thereby assuring greater stability of the reference voltage source. The reference voltage source is made approximately equal to the desired cut-off level for the high-rate charging of the battery connected across the charging terminals 44, 48 and is obtained by adjusting the contactor 64 to selective ones of the taps 62. In the event a finer adjustment is required for the reference voltage source, the reference voltage transformer 52 may be supplemented by a continuously variable auto transformer such that fine accuracy may be attained in the setting of the reference voltage source and the corresponding levels at which the high-rate charging circuit will be selectively completed as a function of the gating of the silicon controlled rectifier 42.

A gating-signal circuit is provided including the reference voltage which is developed across the resistor 76, a series-connected adjustable resistance 78 connected to the negative lead 72 and the corresponding end of the resistor 76, and an adjustable tap 80 connected via lead 82 to the negative charging terminal 48. The positive lead 74 of the direct current reference voltage and the corresponding side of the pre-loading resistance 76 is connected via lead 84 and a protective or blocking diode 86 to the gate 42c of the controlled rectifier. The potential at the gate 42c is relatively constant at the fixed reference voltage across the resistor 76, while the potential at the cathode 42b which is the same as at positive charging terminal 44 will vary as a function of the actual voltage of the battery between the positive and negative charging terminals 44, 48. When the battery voltage is lower than the reference voltage, there will be provided a gating potential or signal. When the magnitude of this gating signal exceeds pre-set limit which in turn may be established by setting the value of the reference voltage, the silicon controlled rectifier 42 will be rendered conductive to establish the high-rate charging circuit thereby allowing current flow via the low impedance path established between the anode 42a and the cathode 42b. Current flow in the high-rate charging circuit will cause a corresponding increase in the voltage of the battery and a reduction in the gating potential for signal as determined by the difference between the battery voltage at the cathode 42b and the fixed reference voltage at the gate 42c. After a predetermined reduction of the gating potential or signal, the controlled rectifier 42 ceases to conduct and again establishes the low rate or trickle charging circuit.

In practical application, the difference in voltage between the conduction and non-conduction of the controlled rectifier 42 is inherently very small, usually of the order of one percent of the gating potential. Non-conduction of the rectifier 42 is also dependent upon the reduction of current through the rectifier which occurs every half cycle due to the inherent ripple voltage of the full wave rectified direct current provided by the full-wave rectifier 36. Thus, the maximum time lapse between the time of reduction of the gating potential to the non-conducting condition and the actual non-conduction of the controlled rectifier 42 is approximately one-half the cycle of the ripple voltage. Due to the relatively small differential between conduction and non-conduction of the silicon controlled rectifier 42, the charger would normally have a tendency to hunt between charging and discharging at a relatively rapid rate, thus not allowing the battery to stabilize or gradually reach predetermined levels of charge. However, the adjustable resistance 78 in the gating-signal circuit enables adjustment of the levels between which the high-rate charging circuit will be completed, opened to establish the trickle rate charging circuit, and once again closed to reestablish the high-rate charging circuit. The inherent characteristic of the silicon controlled rectifier is that the current at the gating potential which is required to fire or render the rectifier 42 conductive is higher than the sustaining current thereafter required to maintain the rectifier 42 in its conducting state or condition. The different firing and sustaining currents which flow in this circuit develop different voltage drops across the resistor 78, thus effectively varying the reference voltage at the gate 42c by an amount which will be a function of the voltage drop across the resistance 78. This automatically establishes two effective reference voltage levels, one before firing of the rectifier and a second and higher after firing and while sustaining the rectifier 42 in its conducting state. The difference in these two effective reference voltages will be a function of the battery voltage at the positive charging terminal 44 and the setting of the adjustable resistor 78. At both levels, the reference voltage is higher than the maximum potential of the battery. The range over which the high-rate charging circuit is maintained is controllable by the parameters of the circuit, the setting of the contactor 64, and the setting of the adjustable tap 80 on the resistance 78.

Connected between the gate 42c and the cathode 42b of the rectifier 42 is a capacitor 88 which will cause a small amount of peaking when the rectifier is rendered conductive and non-conductive thereby more sharply establishing the on and off conditions for the rectifier.

The function of the protective or blocking diode 86 is to reduce current flow between the gate 42c and the cathode 42b when a battery is not connected to the charging terminals 44, 48 and the charger 10 is energized. In the absence of such blocking diode 86, the open circuit terminal voltage of the charger 10 might be considerably higher than the reference voltage thereby causing an excess potential between the gate and cathode and a corresponding damage to the controlled rectifier 42.

In order to protect the controlled rectifier 42 from excessive gate to cathode potentials if a relatively low voltage battery is connected across the charging terminals 44, 48, there is provided in the connection between the positive lead of the reference voltage rectifier 68 and the cathode 42b a zener diode 90 and limiting resistor 92. The values of the diode 90 and of the resistance 92 are selected in relation to the remaining parameters to limit the in-rush of charging current and the momentary high potential resulting from a low battery and high reference potential. As is generally understood, the zener diode 90 inherently has a non-linear characteristic allowing sufficient current to flow through it when a sufficiently high voltage is placed thereacross. The zener diode will conduct in reverse direction at a preset voltage, thus limiting the maximum potential which can be placed across the gate 42c and the cathode 42b. Resistor 92 limits excess currents through the zener diode 90.

From the foregoing, it will be appreciated that the present charger or regulator 10 enables the battery to be kept in constant readiness for use by establishing a controlled trickle charge rate which may be adjusted in accordance with operating requirements. When the battery demands a higher rate of charge, the charger or regulator will actually detect the correct voltage to switch over to the high rate of charge and will respond immediately. It will be appreciated that since there are no moving parts, the possibility of burning or pitting of contacts as might occur when employing electromechanical relays is eliminated. Further, since the device uses solid state circuit elements, it is free from the effects of vibration and relatively free from the effects caused by changes in altitudes and/or temperature. Inherently, commercially available silicon controlled rectifiers accurately will become conductive and non-conductive in accordance with the setting of the circuitry over wide temperature ranges. Inverse temperature characteristics can be obtained by employing an inverse temperature coefficient resistor in the gating-signal circuit. When inversely temperature compensated, the circuit will meet the charging requirements of the battery at high and low ambient temperature conditions. The ratings of commercially available controlled rectifiers are in the order of hundreds of volts and hundreds of amperes thereby eliminating the need for heavy contactors and relay assemblies for attaining high battery currents and voltages in the charging circuit. The range over which the battery will charge at the high rate, and the corresponding level at which it will switch over to the low rate is not only adjustable, but is also not dependent upon the previous magnetic history of the circuit, spring tension, contact adjustment, temperature and other variables.

Virtually all types of batteries may be charged at different rates, both for the high-rate charge and for the trickle rate charge, as a function of the volts per cell of the battery. This may be readily achieved by adjustment of the potential applied to the silicon controlled rectifier, by the setting of the reference potential, and by the setting of the range for high and low rate charging. In the first instance, rated current capacities for the battery will not be exceeded in that corresponding adjustments can be made in the maximum charging potential by appropriate adjustments of the power transformer in the charging circuit.

A latitude of modification, change and substitution is intended in the foregoing disclosure, and in some instances some features of the invention will be employed without a corresponding use of other features. Accordingly it is appropriate that the dependent claims be construed in a manner consistent with the spirit and scope of the disclosure herein.

What I claim is:

1. A battery charger comprising a charging source of direct current potential, a reference source of direct current potential, positive and negative charging terminals adapted to have the corresponding terminals of a battery connected thereto, a controlled rectifier including a cathode, anode, and a gate, said controlled rectifier blocking in the forward direction until a gating signal is applied to said gate and thereafter conducting in the forward direction, means connecting said anode to the positive side of said charging source, means connecting the negative side of said charging source to said negative charging terminal, means connecting said cathode to said positive charging terminal, a gating-signal circuit including a resistance connected in series between said reference source and said negative charging terminal for producing a gating signal as a function of the difference between the reference potential of said reference source and the voltage drop across said resistance and the variable potential of the battery connected across said charging terminals, said rectifier when conducting in the forward direction establishing a high-rate charging circuit for said battery, and a resistance bypassing said controlled rectifier and establishing a trickle charging circuit for said battery when said controlled rectifier is blocking, said reference source of direct current potential including a voltage-stabilizing means adapted to be connected to a source of alternating current, and a full-wave rectifier having its input connected to said voltage-stabilizing means, and a preloading resistor connected across the output of said full-wave rectifier and providing said reference potential in said gating-signal circuit.

2. A battery charger comprising a charging source of direct current potential, a reference source of direct current potential, positive and negative charging terminals adapted to have the corresponding terminals of a battery connected thereto, a controlled rectifier including a cathode, anode, and a gate, said controlled rectifier blocking in the forward direction until a gating signal is applied to said gate and thereafter conducting in the forward direction, means connecting said anode to the positive side of said charging source, means connecting the negative side of said charging source to said negative charging terminal, means connecting said cathode to said positive charging terminal, means including a zener diode and a resistance connecting the positive side of said reference source to said cathode, a gating-signal circuit including a resistance connected in series between said reference source and said negative charging terminal for producing a gating signal, said rectifier when conducting in the forward direction establishing a high-rate charging circuit for said battery, a resistance bypassing said controlled rectifier and establishing a trickle charging circuit for said battery when said controlled rectifier is blocking.

3. A battery charger according to claim 2 including means for adjusting the magnitude of said reference source.

4. A battery charger comprising a charging source of direct current potential, a reference source of direct current potential, positive and negative charging terminals adapted to have the corresponding terminals of a battery connected thereto, a controlled rectifier including a cathode, anode, and a gate, said controlled rectifier blocking in the forward direction until a gating signal is applied to said gate and thereafter conducting in the forward direction, means connecting said anode to the positive side of said charging source, means connecting the negative side of said charging source to said negative charging terminal, means connecting said cathode to said positive charging terminal, a gating-signal circuit including a resistance connected in series between the negative side of said reference source and said negative charging terminal for producing a gating signal, a blocking diode connected between the positive side of said reference source and said gate and poled to limit current flow between said gate and cathode, said rectifier when conducting in the forward direction establishing a high-rate charging circuit for said battery, and a resistance bypassing said controlled rectifier and establishing a trickle charging circuit for said battery when said controlled rectifier is blocking.

5. A battery charger comprising a charging source of direct current potential, a reference source of direct current potential, positive and negative charging terminals adapted to have the corresponding terminals of a battery connected thereto, a controlled rectifier including a cathode, anode and a gate, said controlled rectifier blocking in the forward direction until a gating signal is applied to said gate and thereafter conducting in the forward direction, a capacitor connected between said gate and cathode, means connecting said anode to the positive side of said charging source, means connecting the negative side of said charging source to said negative charging terminal, means connecting said cathode to said positive charging terminal, a gating-signal circuit including a resistance connected in series between said reference source and said negative charging terminal for producing a gating signal as a function of the difference between the combined potential of said reference source and the drop across said resistance and the potential of the battery connected across said charging terminals, said rectifier when conducting in the forward direction establishing a high-rate charging circuit for said battery, and a resistance bypassing said controlled rectifier and establishing a trickle charging circuit for said battery when said controlled rectifier is blocking.

6. A battery charger comprising a charging source of direct current potential, a reference source of direct current potential, positive and negative charging terminals adapted to have the corresponding terminals of a battery connected thereto, a controlled rectifier including a cathode, anode and a gate, said controlled rectifier blocking in the forward direction until a gating signal is applied to said gate and thereafter conducting in the forward direction, a capacitor connected between said gate and cathode, means connecting said anode to the positive side of said charging source, means including an adjustable resistance connecting the negative side of said charging source to said negative charging terminal, means connecting said cathode to said positive charging terminal, a gating-signal circuit including a resistance connected in series between said reference source and said negative charging terminal for producing a gating signal, a blocking diode connected between said reference source, said cathode and said gate and poled to limit current flow between said gate and cathode, said rectifier when conducting in the forward direction establishing a high-rate charging circuit for said battery, and an adjustable resistance bypassing said controlled rectifier and establishing a trickle charging circuit for said battery when said controlled rectifier is blocking.

References Cited by the Examiner

UNITED STATES PATENTS

| | | | |
|---|---|---|---|
| 2,285,620 | 6/42 | Sears | 323—42.5 X |
| 2,776,382 | 1/57 | Jensen | 307—97 |
| 2,992,379 | 7/61 | Rosin | 323—43.5 X |
| 3,007,102 | 10/61 | Kennedy | 323—22 |
| 3,018,432 | 1/62 | Palmer | 323—22 |
| 3,076,128 | 1/63 | Toski et al. | 323—22 X |

OTHER REFERENCES

Basic Theory and Application of Transistors, Army Technical Manual, TM 11–690, March 1959, page 98.

General Electric Controlled Rectifier Manual, First edition, March 12, 1960, pages 75, 85, and 86—TK 2798G4g.

LLOYD McCOLLUM, *Primary Examiner.*